April 28, 1925. 1,535,791
W. RAEBURN
PULLEY
Filed Jan. 3, 1924
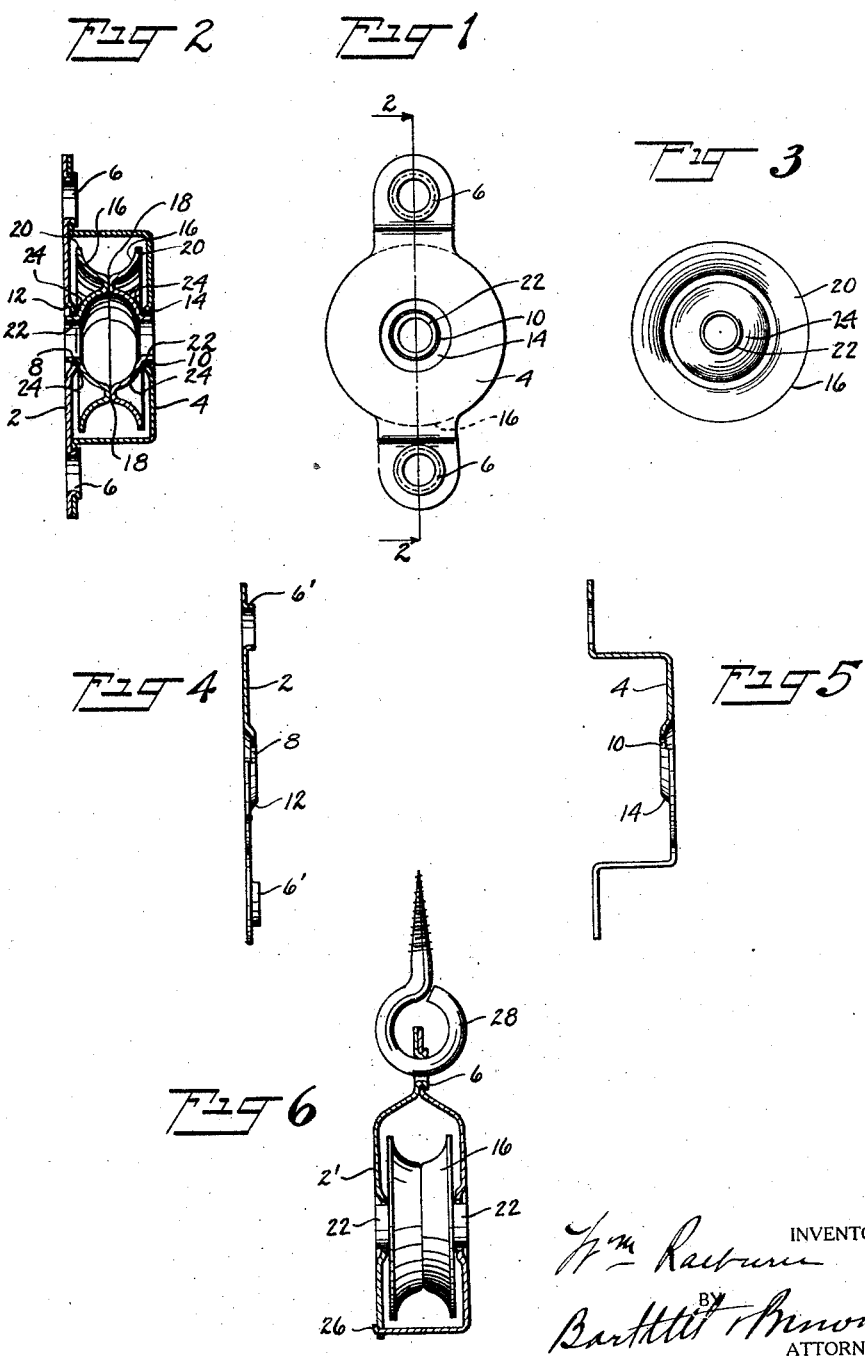

Patented Apr. 28, 1925.

1,535,791

UNITED STATES PATENT OFFICE.

WILLIAM RAEBURN, OF WATERBURY, CONNECTICUT, ASSIGNOR TO THE MATTATUCK MANUFACTURING COMPANY, OF WATERBURY, CONNECTICUT, A CORPORATION OF CONNECTICUT.

PULLEY.

Application filed January 3, 1924. Serial No. 684,161.

*To all whom it may concern:*

Be it known that I, WILLIAM RAEBURN, a citizen of the United States, residing at Waterbury, county of New Haven, State of Connecticut, have invented certain new and useful Improvements in Pulleys, of which the following is a full, clear, and exact description.

My invention relates to improvements in pulleys and has for its object to provide a sheet metal pulley of new and improved construction. It further has for its object to provide a pulley having a housing and in which the sheet metal pulley wheel has integral trunnions passing through the housing and has its periphery spaced away from the housing in a new and improved manner. A further object is to provide a new and improved housing for the pulley wheel.

The following is a description of an embodiment of my invention, reference being had to the accompanying drawings, in which Figure 1 is a side elevation of a pulley embodying my invention;

Fig. 2 is a longitudinal section of the same on the line 2—2 of Fig. 1;

Fig. 3 is a section through the axis of one-half of the pulley wheel;

Fig. 4 shows the base-plate of the housing frame partly in longitudinal section;

Fig. 5 is a similar view of the housing yoke; and

Fig. 6 shows a partial longitudinal section of a pulley having a modified housing.

Referring more particularly to the drawings, 2 is the base member of the pulley housing and 4 is the spanning member of said housing, the base member being connected to the spanning member by eyelets 6 which are integral with the base member 2, being formed as shown at 6' in Fig. 4 and bent down after the parts 2 and 4 are assembled so as to hold the same firmly together.

The two members of the housing are provided with alined openings 8 and 10 respectively, the metal of the members 2 and 4 being forced in slightly adjacent to said openings to form bosses 12 and 14. Within the housing is a pulley wheel composed of two counterpart members 16 spot-welded together at 18. These pulley members have flanges 20 forming the groove in the pulley wheel and have tubular projections 22 which pass through the openings 8 and 10 respectively so as to form trunnions for the pulley wheel. The portion of each side of the pulley wheel immediately surrounding its trunnions 22 is forced outwardly so as to form annular cup-shaped bosses 24, the end surface portions of which engage the ends of the bosses 12 and 14. The housing bosses 12 and 14 and the wheel bosses 24 cooperate to provide rigid thrust bearing surfaces of substantial area for the wheel which prevents any appreciable axial play of the wheel. These bosses also serve to stiffen the wheel and the sides of the housing, and also to space the sides of the rim of the wheel from the sides of the housing.

With the construction shown, all the parts are made up from sheet metal in an inexpensive manner, there being in the embodiment shown only four parts, two in the housing and two in the pulley wheel. The pulley is nevertheless strong and efficient.

In the modification shown in Fig. 6, the housing at one end, instead of being secured by a second tubular rivet as in Fig. 1, is provided with a tang 26 which passes through a slot in the housing member 2', the pulley being otherwise constructed as shown in Figs. 1 to 5 inclusive. This modified form of pulley is particularly desirable where it is to be secured by a screw eye 28 passing through its eyelet.

As will be evident to those skilled in the art, my invention permits of various modifications without departing from the spirit thereof or the scope of the appended claims.

What I claim is:

1. A pulley comprising a housing having substantially parallel perforated sides, and a sheet metal pulley wheel composed of two parts secured together, each part having a hollow tubular projection passing through one of the sides of said housing and forming a trunnion for the wheel, and a boss surrounding the axis of said projection and engaging the corresponding side of the housing so as to space the rim of the pulley therefrom.

2. A pulley comprising a housing having substantially parallel perforated sides, and a sheet metal pulley wheel composed of two parts secured together, each part having a hollow tubular projection passing through one of the sides of said housing and forming a trunnion for said wheel, and a boss surrounding the axis of said projection and engaging the corresponding side of the housing so as to space the rim of the pulley therefrom, said housing being made of sheet metal and having slightly reentrant portions around said perforations.

3. A pulley comprising a housing having substantially parallel perforated sides and a sheet metal pulley wheel composed of two parts secured together, each part having a hollow tubular projection passing through one of the sides of said housing and forming a trunnion for said wheel, and a boss surrounding the axis of said projection and engaging the corresponding side of the housing so as to space the rim of the pulley therefrom, said housing being made of two sheet metal portions secured together at points diametrically opposite the axis of said pulley wheel.

4. A pulley comprising a housing having substantially parallel perforated sides, and a sheet metal pulley wheel composed of two parts secured together, each part having a hollow tubular projection passing through one of the sides of said housing and forming a trunnion for said wheel, and a boss surrounding the axis of said projection and engaging the corresponding side of the housing so as to space the rim of the pulley therefrom, said housing being made in two parts one of said parts being substantially flat and extending over one side of the wheel and the other being substantially U-shaped and extending over the other side and across diametrically opposed peripheral portions of the wheel.

5. A pulley comprising a housing having substantially parallel sides, each side having a circular aperture with the portion of the material surrounding the aperture bent inwardly to provide an annular boss, and a pulley wheel composed of two parts of sheet metal secured together each part having a tubular projection passing through the aperture in one of the sides of said housing and forming a trunnion for the wheel and having the portion thereof surrounding the tubular projection bent outwardly to form a boss, the ends of the bosses on each side of the wheel and the adjacent side of the housing engaging so as to form a thrust bearing for the wheel and to space the rim of the wheel from the side of the housing.

WILLIAM RAEBURN.